Figure 1:
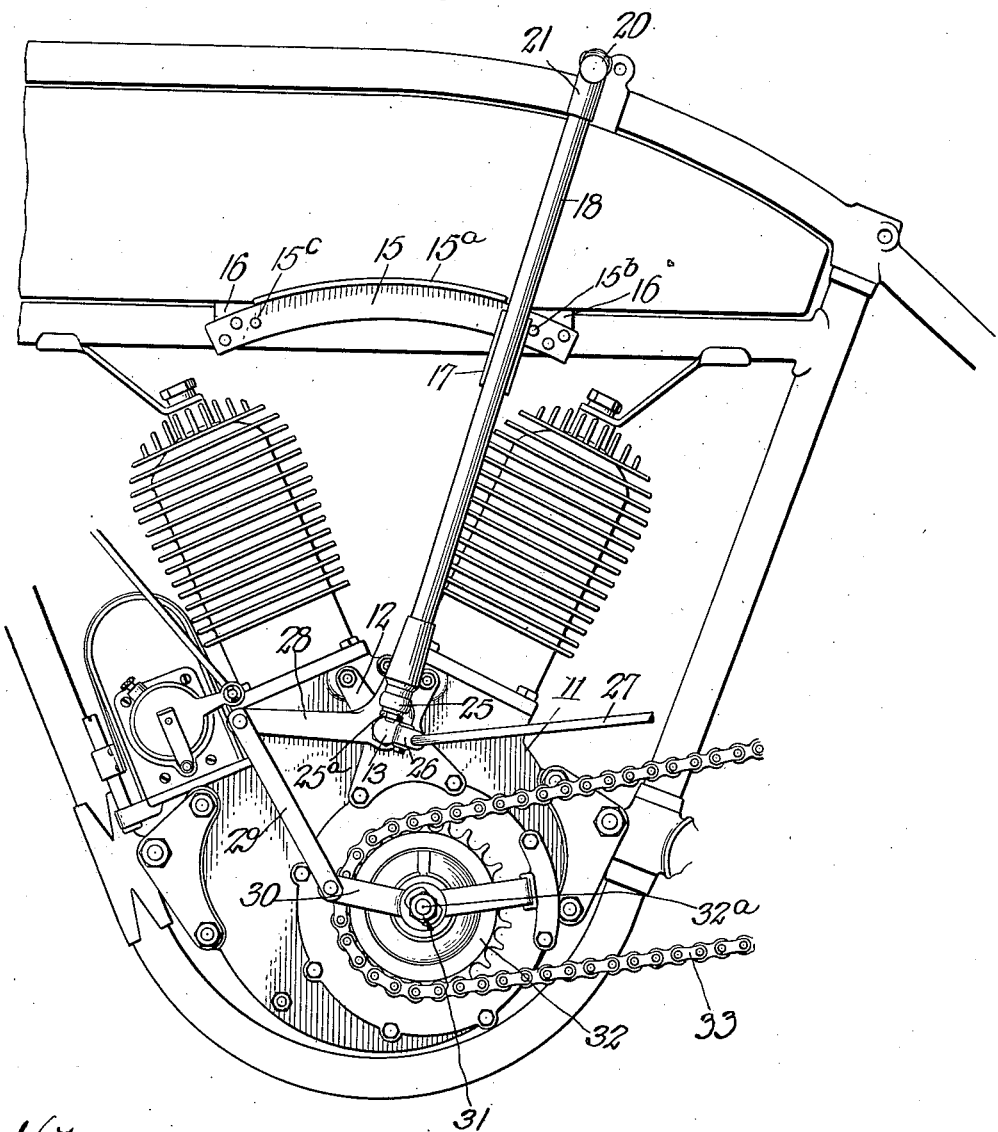

F. E. SPERRY.
UNIT CONTROL DEVICE.
APPLICATION FILED AUG. 26, 1912.

1,095,530.

Patented May 5, 1914.

2 SHEETS—SHEET 1.

Witnesses:
T. H. Alfuda
Chas. H. Poole

Inventor
Frank E. Sperry
by Poole & Cromer Attys

F. E. SPERRY.
UNIT CONTROL DEVICE.
APPLICATION FILED AUG. 26, 1912.
1,095,530.
Patented May 5, 1914.
2 SHEETS—SHEET 2.
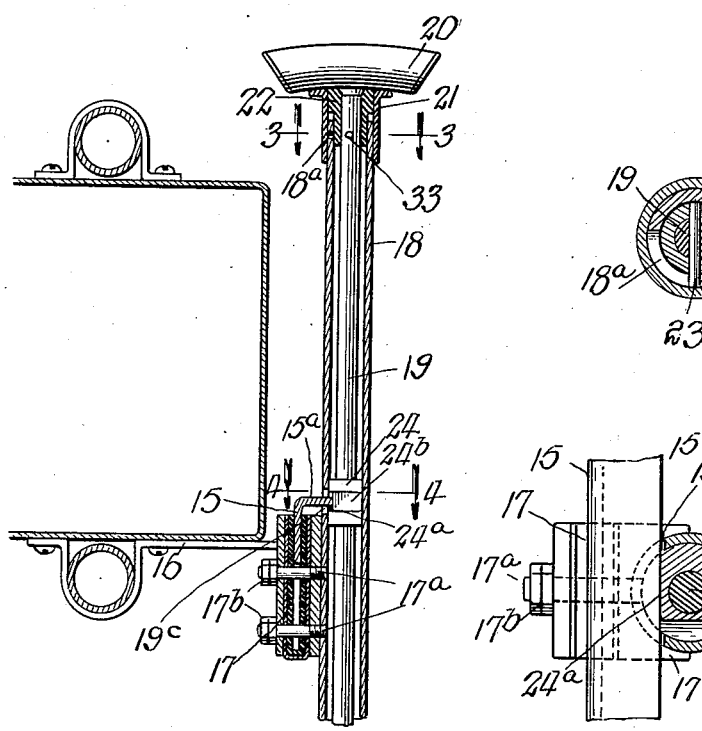
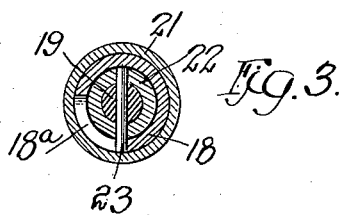
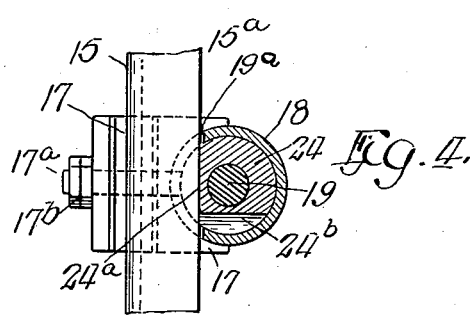
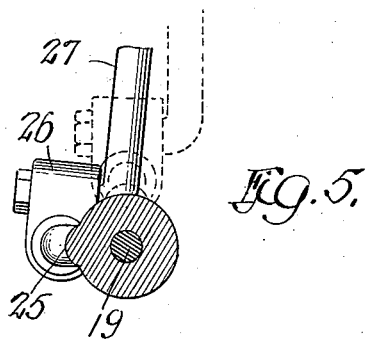
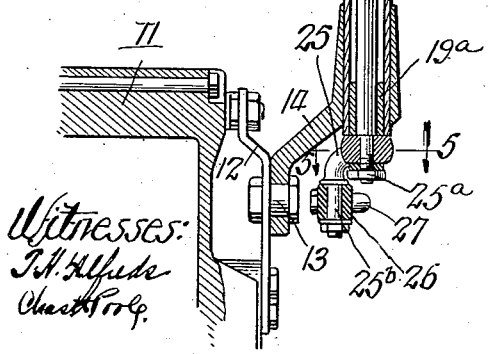
Witnesses:
Inventor
Frank E. Sperry
by Poole + Cromer Attys

UNITED STATES PATENT OFFICE.

FRANK E. SPERRY, OF AURORA, ILLINOIS, ASSIGNOR TO AURORA AUTOMATIC MACHINERY COMPANY, OF CHICAGO, ILLINOIS, A CORPORATION OF ILLINOIS.

UNIT-CONTROL DEVICE.

1,095,530.       Specification of Letters Patent.        Patented May 5, 1914.

Application filed August 26, 1912. Serial No. 717,110.

*To all whom it may concern:*

Be it known that I, FRANK E. SPERRY, a citizen of the United States, and a resident of Aurora, in the county of Kane and State of Illinois, have invented certain new and useful Improvements in Unit-Control Devices; and I do hereby declare that the following is a full, clear, and exact description thereof, reference being had to the accompanying drawings, and to the letters of reference marked thereon, which form a part of this specification.

This invention relates to improvements in unit controlling devices, for clutch and change speed mechanisms or similarly operated mechanisms of motor driven vehicles, and more particularly to improvements in that class of controlling devices for clutch and change speed mechanisms or similarly operated mechanisms, in which a single control lever is used and means provided whereby the operation of one mechanism is alternately made dependent upon the operation of the other.

The principal object of this invention is to provide a simple, economical and efficient unit controlling device and change speed mechanism for motor driven vehicles.

A further object of the invention is to provide means whereby the control of a clutch and change speed mechanism may be accomplished by the operation of a single unit, and also to provide a construction whereby the change speed operating member can only be operated at one position of the control lever, namely, that position of the control lever in which the clutch is released, or, more specifically, when the driving mechanism is independent of the motive power plant.

The device herein described is shown as comprising a manually operable controlling lever applied to a motor cycle. It is not desired, however, to limit or restrict the invention to the construction herein shown or in any manner except as set forth in the claims.

The invention and improvements herein shown and described may be applied to any and all motor driven vehicles having clutch and change speed device operative members, or to other mechanisms adapted to be actuated by the means herein described, or similar means, and more particularly to any form of controlling device having a manually operable control lever constructed and adapted to operate in the manner shown or in a similar manner.

This invention consists in the matters herein set forth and more particularly pointed out in the claims.

In the accompanying drawings Figure 1 is a view in side elevation of a device constructed in accordance with my invention and improvements and showing my improved controlling lever mounted upon a motor cycle, and the clutch controlling links and a portion of the change speed controlling rod; Fig. 2, a detail view in transverse section, showing the control lever in longitudinal section, and a portion of the tank and crank case; Fig. 3, a detail view in cross section through the controlling lever taken on line 3—3 of Fig. 2; Fig. 4, a detail view in cross section through the controlling lever, taken on line 4—4 of Fig. 2, and showing a portion of the quadrant in Fig. 1; and Fig. 5, a detail view in approximately horizontal section taken on line 5—5 of Fig. 2, looking downward, and showing the crank connected with the shaft member of the controlling lever, and the means for connecting the crank with the speed changing or change speed mechanism.

Referring to the drawings, the unit control lever 18 is pivotally mounted at its lower end and attached to the crank case 11 of the motor, by means of a bracket or lever-supporting portion 12 on the crank case, and a bolt or horizontal pivot 13 which passes through the said bracket 12 and through an arm or bottom end portion 14 of the control lever. The extent of rotation or pivotal movement about the bolt or horizontal pivot 13 is limited by a quadrant 15 which is attached to the frame of the vehicle by suitable means such as braces 16, and provided with stops 15$^b$, 15$^c$ at each extremity for engaging and limiting the backward and forward movement of said lever. Said quadrant is provided with an angular projecting or segmental locking flange 15$^a$ extending substantially to a stop at one end, and at the other end terminating at a distance from the adjacent stop 15$^b$ equal to approximately the diameter of the control lever or at a point which will enable the flange 15ª of the quadrant to remain out of engagement with the speed changing mechanism when the lever is in position to release the clutch mechanism, as shown in Fig. 1. A clamp 17 is rigidly attached to the control lever, the jaws of which clamp are faced with suitable material such as compressed fiber adapted to engage the quadrant and, by frictional engagement therewith, to hold the control lever in any position, between the extremities of said quadrant 15 to which it may be adjusted. The studs 17ª not only attach the clamp 17 to the body or outer tubular member 18 of the control lever, but, by means of the adjustable lock nuts 17ᵇ, the frictional contact between the said clamp 17 and the surface of the quadrant 15 may be increased or decreased as desired.

The outer tubular lever body 18 is rigidly connected at its lower end with the arm 14, and a shaft 19 is journaled therein and adapted to be rotated within the tubular member when the latter is in such position that the clutch operated thereby is released. Said shaft supports at its upper end a handle 20 which is fixed to or integral with the shaft. This handle is adapted to give a rotative movement to the shaft and to act as a convenient means of moving the whole lever, including the outer tubular member and shaft on the horizontal pivot formed by the bolt 13, backward and forward along the quadrant 15. The axis of the shaft is perpendicular to the horizontal axis of the lever as a whole, or to the axis formed by the pivot 13, and the shaft is adapted to be rotated on its axis to a sufficient extent to cause the speed changing mechanism to change the speed of the vehicle, such speed being determined and changed by the rotation of said shaft to different positions. A sleeve 21 and a bushing 22 are provided and secured in fixed relation to each other and to the shaft 19 (see Figs. 2 and 3). These serve as outer and inner bearing members between which the tubular lever body extends, so as to permit and facilitate the rotation of the shaft. A pin 23 extends through the shaft 19 and the bushing 22. One extremity of this pin extends beyond said bushing 22 and into engagement with a transverse segmental slot 18ª in the lever body 18 (see Figs. 2 and 3). Said slot 18ª occupies an angle of approximately 90° of the total circumference of the lever body, and the pin and shaft thus limit the rotation of the shaft 19 to a like angle.

A collar 24 is attached to and rotatable with the shaft 19 adjacent to the segmental flange 15ª of the quadrant and to the clamp 17 (see Figs. 2 and 4). Said collar is provided with two transverse segmental slots 24ª and 24ᵇ upon its surface (see Figs. 2 and 4), said slots being, by preference, at right angles to each other and adapted to successively engage the angular projection or segmental flange 15ª of the quadrant 15, so as to enable the rotation of the shaft 19 to be prevented while the flange and either of said slots are in engagement. An adjacent portion of the tubular lever body 18 is cut away so as to form a transverse peripheral slot 19ª to make possible such engagement.

A crank arm 25 is rigidly attached to the lower extremity of the shaft 19 by means of a stud 25ª, the same having bearing upon the adjacent extremity or end of the tubular lever body 18 and a bushing 19ª. The crank arm 25 is also provided with a swivel block 26 connected therewith and adapted to rotate upon a crank pin 25ᵇ on said crank arm. Attached to the said swivel block 26 is a rod 27 which extends to and is connected with and adapted to operate the change speed mechanism.

At the lower end of the control lever and in fixed relation to the lever body 18 is a rocker or lever arm 28, lying in a plane perpendicular to the axis of the pivotal bolt 13 and projecting at approximately an angle of 90° to the axis of the control lever proper. Loosely attached to the extremity of the rocker arm or lever member 28 is a link 29, which in turn is loosely attached to the operative arm 30 of the clutch 31. When the control lever is in the position shown in Fig. 1, it is in one of its extreme positions, due to the contact of the clamp 17 and a stop 15ᵇ, of the quadrant 15. In this position only the clutch is completely released so that the motor may continue to run without transmitting any power to the driving member or sprocket wheel 32 which is operatively connected with the driving wheel of the vehicle by means of a chain 33 or by any suitable known or desired means. In this position also the angular projection or segmental flange 15ª of the quadrant does not engage either of the transverse slots 24ª or 24ᵇ of the collar 24, hence in this position, and in this position only, the shaft 19 may be rotated relative to the lever body 18 so as to change the speed of the vehicle, said rotary movement being limited to an angular distance or a partial rotation of approximately 90° by the action of the pin 23 fixed to the shaft 19 and extending into the slot 18ª of the lever body 18. By partially rotating or rocking the shaft 19—while the lever as a whole is in clutch releasing position, or in the position shown in Fig. 1—through the said angle of 90° or from a position in which one of the slots 24ª or 24ᵇ is engaged by the member 15ª to a position in which the other of said slots is so engaged, a change of speed from high to low or vice versa is obtained. Furthermore when the shaft 19 is in either of its two positions into which it is thus adapted to be rotated relative to the tubular lever member 18 and with the lever as a whole in such position that one of the slots 24ª or 24ᵇ of the collar 24 is in a position to engage the angular projection or flange 15ª of the quadrant 15, the said shaft will be securely held against rotation until the lever is again moved to clutch-releasing position. The shaft having been rotated while in such position that the collar 24 and its slots are out of engagement with the flange 15ª of quadrant 15 and in clutch-releasing position shown in Fig. 1, the control lever is then moved forward or toward the opposite extreme position, thus causing the clutch to be thrown into its clutching position and operatively connecting the sprocket wheel 32 with the crank shaft or driving shaft 32ª of the engine, in such a manner that power is transmitted from the motor to the driving member or sprocket and to the driving wheel of the vehicle. If a change of speed is desired the control lever is brought back to its original position—the position shown in Fig. 1—thereby releasing the clutch, and the shaft is rotated or turned by means of the handle 20 into position to bring the desired one of the slots 24ª or 24ᵇ into such position that it will engage the locking member or segmental flange 15ª as soon as the lever as a whole is moved to position to permit such engagement. By then pushing the lever forward the motor will be again operatively connected with the drive wheel of the vehicle with the change speed mechanism in such position that the vehicle will again be driven forward, but at a different speed.

From the foregoing it will be evident that the operation of the device is consistent with an important principle followed in motor vehicle construction and operation, namely, that the clutch should be released while a change of speed is being made, and that the mechanism by means of which the speed is changed should be operated only while the clutch is released. The control lever is prevented from engaging the clutch without the change speed device being first shifted to a correct driving position, and the change speed control shaft is securely locked in such position as to prevent the change speed mechanism from being operated or moved from one speed changing position to another while the control lever is in any other than clutch-releasing position.

I claim:

1. In a device of the class described, the combination of an oscillating lever, a rock-shaft supported by and moving with said oscillating lever and adapted to be operated only when said lever is in a predetermined position, means for operatively connecting said rock-shaft with the change speed mechanism of the vehicle, means for operatively connecting said oscillating lever with the clutch mechanism of the vehicle, and means for locking the rock-shaft adapted to prevent the rotative movement of said rock-shaft when said oscillating lever is in any position other than said predetermined position and to permit the rotative movement of said rock-shaft only when the said oscillating lever is in the said predetermined position.

2. In a device of the class described, the combination of an oscillating lever, a rock-shaft supported by and moving with said oscillating lever and adapted to be operated only when said lever is in one predetermined position, means for operatively connecting said rock-shaft with the change speed mechanism of the vehicle, means for operatively connecting the oscillating lever with the clutch mechanism of the vehicle, means for locking the rock-shaft adapted to prevent the rotation of the latter when the oscillating lever is in any position other than said predetermined position and to permit the rotative movement of said rock-shaft only when the said oscillating lever is in the said predetermined position, and a handle mounted upon said rock-shaft and movable with said oscillating lever, adapted to operate said lever and said rock-shaft.

3. In a device of the class described, the combination of an oscillating lever, means for pivotally supporting said lever upon the vehicle frame, a rock-shaft supported by and movable with said oscillating lever and provided with locking means, said rock-shaft being adapted to be operated when said lever is in a predetermined position, means for operatively connecting said rock-shaft with the change speed mechanism of the vehicle, means for operatively connecting the oscillating lever with the clutch mechanism of the vehicle, and a locking member mounted upon the vehicle frame and in engagement with the locking means of said rock-shaft for locking the same non-rotatably adapted to prevent the operation of said shaft when the oscillating lever is in any position other than said predetermined position.

4. In a device of the class described, the combination of an oscillating lever, means for pivotally supporting said lever upon the vehicle frame, a rock-shaft supported by and movable with said oscillating lever and adapted to be operated when said lever is in a predetermined position, means for operatively connecting said rock-shaft with the change speed mechanism of the vehicle, means for operatively connecting the oscillating lever with the clutch mechanism of the vehicle, a locking member movable with the oscillating lever and operated by the said rock-shaft, and a locking member mounted upon the vehicle frame and in engagement with the first mentioned locking member for locking the said shaft non-rotatably, adapted to prevent the operation of said shaft when the oscillating lever is in any position other than said predetermined position.

5. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of the vehicle, means for operatively connecting the oscillating lever with the clutch mechanism of the vehicle, a locking member upon and movable with the rock shaft, and a locking member mounted upon the vehicle frame and in engagement with the locking member upon said shaft, for locking the latter non-rotatably, adapted to prevent the operation of said shaft when the oscillating lever is in any position other than said predetermined position.

6. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of vehicle, means for operatively connecting the oscillating lever with the clutch mechanism of the vehicle, a locking member upon and movable with the rock shaft, and a quadrant mounted adjacent to said locking member and adapted to engage and prevent the operation of the latter in any position other than said predetermined position.

7. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of the vehicle, means for operatively connecting the oscillating lever with the clutch mechanism of the vehicle, a locking member upon and movable with the rock shaft, and a quadrant mounted adjacent to said locking member and adapted to engage the latter when the oscillating lever is in any position other than said predetermined position.

8. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of the vehicle, means for operatively connecting the oscillating lever with the clutch mechanism of the vehicle, a locking member upon and movable with the rock shaft, a quadrant mounted adjacent to said locking member and adapted to engage the latter when the oscillating lever is in any position other than said predetermined position, and means for operatively connecting the oscillating lever with said quadrant.

9. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of the vehicle, means for operatively connecting the oscillating lever with the clutch mechanism of the vehicle, a locking member upon and movable with the rock shaft, a quadrant mounted adjacent to said locking member and adapted to engage the latter when the oscillating lever is in any position other than said predetermined position, and a clamping member mounted upon the oscillating lever and in engagement with said quadrant.

10. In a device of the class described, the combination of an oscillating lever, means for pivotally supporting said lever upon a vehicle frame, a rock shaft supported by and movable with said oscillating lever and adapted to be operated when said lever is in a predetermined position, a crank arm upon the rock shaft, means for connecting said crank arm with the change speed mechanism of the vehicle, means for operatively connecting the oscillating lever with the clutch mechanism of the vehicle, a locking member upon and movable with the rock shaft, a quadrant mounted adjacent to said locking member and adapted to engage and prevent the operation of the latter in any position other than said predetermined position, a clamping member mounted upon the oscillating lever and in engagement with said quadrant, and means for limiting the rotary movement of the rock shaft when the oscillating lever is in said predetermined position.

11. In a unit control device, the combination of an oscillating lever comprising a tubular portion provided with a transverse opening, a quadrant mounted upon a suitable support and provided with a projecting portion adapted to extend into said opening, and a shaft rockingly mounted within the tubular portion of the lever member and provided with a locking portion having peripheral slots disposed at an angle with relation to each other and located adjacent to said opening in the tubular portion of the lever member and adapted to be moved successively into position to be engaged by said projecting portion of the quadrant.

12. In a unit control device for motor vehicles, the combination of an oscillating lever comprising a tubular portion provided with a transverse opening, a quadrant attached to the frame of the vehicle and provided with a projecting flange adapted to extend into said opening, a shaft rockingly mounted within the tubular portion of the lever member, and movable lengthwise of said flange, beyond the end of and out of engagement with the latter, and a locking member upon said shaft provided with transverse slots disposed at an angle with relation to each other and located adjacent to said transverse opening in the tubular portion of the lever member and adapted to be successively engaged by said projecting portion of the quadrant.

13. In a unit control device for motor vehicles, the combination of an oscillating lever comprising a tubular portion provided with a transverse opening, a quadrant attached to the frame of the vehicle and provided with a projecting flange adapted to extend into said opening, a shaft rockingly mounted within the tubular portion of the lever member, and movable lengthwise of said flange, beyond the end of and out of engagement with the latter, a locking member upon said shaft provided with transverse slots disposed at an angle with relation to each other and located adjacent to said transverse opening in the tubular portion of the lever member and adapted to be successively engaged by said projecting portion of the quadrant, and stops located adjacent to the opposite ends of said flange and adapted to engage and limit the movement of the lever with relation to the flange.

14. In a unit control device for motor vehicles, the combination of an oscillating lever pivotally mounted upon the frame of the vehicle, a quadrant attached to the frame of the vehicle and provided with a segmental flange, a shaft rockingly mounted in engagement with and supported by said oscillating lever and adapted to be operated when the lever is in a predetermined position, a locking member fixed to said shaft and movable longitudinally of and endwise beyond said flange, and provided with flange-engaging surface portions disposed at an angle with relation to each other and adapted to be moved successively into flange-engaging position, and means for limiting the rotary movement of the shaft when the said locking element is out of engagement with the flange.

15. In a unit control device for motor vehicles, the combination of an oscillating lever pivotally mounted upon the frame of the vehicle, a quadrant attached to the frame of the vehicle and provided with a segmental flange, a shaft rockingly mounted in engagement with and supported by said oscillating lever, and adapted to be operated when the lever is in a predetermined position, a locking member fixed to said shaft and movable longitudinally of and endwise beyond said flange and provided with peripheral slots disposed at an angle with relation to each other and adapted to be moved successively into position to be engaged by the flange, means for limiting the rotary movement of the shaft when the said locking element is out of engagement with the flange, and a clamp supported by and movable with said oscillating lever and in frictional engagement with said quadrant.

16. In a unit control device for motor vehicles, the combination of an oscillating lever pivotally mounted upon the frame of the vehicle, a quadrant attached to the frame of the vehicle and provided with a segmental flange, a shaft rockingly mounted in engagement with and supported by said oscillating lever and adapted to be operated when the lever is in a predetermined position, a locking member fixed to said shaft and movable longitudinally of and endwise beyond said flange, and provided with peripheral slots disposed at an angle with relation to each other and adapted to be moved successively into position to be engaged by the flange, means for limiting the rotary movement of the shaft when the said locking element is out of engagement with the flange, means for operatively connecting the oscillating lever with the clutch mechanism of the vehicle, a crank upon said shaft, and means for connecting said crank with the speed change mechanism of the vehicle.

17. In a unit control device for motor vehicles, the combination of an oscillating lever pivotally mounted upon the frame of the vehicle, a quadrant attached to the frame of the vehicle and provided with a segmental flange, a shaft rockingly mounted in engagement with and supported by said oscillating lever and adapted to be operated when the lever is in a predetermined position, a locking member fixed to said shaft and movable longitudinally of and endwise beyond said flange, and provided with peripheral slots disposed at an angle with relation to each other and adapted to be moved successively into position to be engaged by the flange, means for limiting the rotary movement of the shaft when the said locking element is out of engagement with the flange, means for operatively connecting the oscillating lever with the clutch mechanism of the vehicle, a crank upon said shaft, and a connecting rod connected with said crank and adapted to be operatively connected with the speed change mechanism of the vehicle.

18. In a unit control device for motor vehicles, the combination of an oscillating lever comprising a tubular portion provided with a plurality of peripheral slots, a quadrant attached to the frame of the vehicle and provided with a flange adapted to extend into one of said slots, a shaft rockingly mounted within the tubular portion of the lever member and provided with a laterally projecting boss extending into the other of said slots in the tubular portion of the lever member, and a collar fixed to said shaft and provided with transverse slots disposed at an angle with relation to each other, adjacent to and adapted to be successively moved into position to be engaged by said flange.

19. In a controlling device for motor vehicles, the combination of a pivoted lever comprising a tubular portion, a quadrant attached to the frame of the vehicle and located adjacent to said lever, a shaft rockingly mounted in and movable with said lever and adapted to be partially rotated with respect to the lever when the latter is in a predetermined position, a locking member in fixed relation to the shaft and movable into and out of engagement with the quadrant and adapted to prevent the rotation of the shaft when said locking member is in engagement with the quadrant, and means for limiting the rotary movement of the shaft when said locking member is out of engagement with the quadrant.

20. In a controlling device for motor vehicles, the combination of a pivoted lever, a guiding member located adjacent to said lever and attached to the frame of the vehicle, a shaft rockingly mounted and movable with said lever and adapted to be partially rotated with respect to the latter when the lever is in a predetermined position, clutch mechanism comprising clutch members operatively connected with said pivoted lever and adapted to be moved by the latter to releasing position when said pivoted lever is in said predetermined position, means movable with the shaft into and out of engagement with said guiding member, for preventing the rotation of the shaft when the lever is in any position other than said predetermined position, and means for operatively connecting said rock shaft with the speed changing mechanism of the vehicle.

21. In a controlling device for motor vehicles, the combination of a pivoted lever comprising a tubular portion, a quadrant attached to the frame of the vehicle and located adjacent to said lever, a shaft rockingly mounted in and movable with said lever and adapted to be partially rotated with respect to the lever when the latter is in a predetermined position, a locking member in fixed relation to the shaft and movable into and out of engagement with the quadrant and adapted to prevent the rotation of the shaft when said locking member is in engagement with the quadrant, means for operatively connecting said pivoted lever with the clutch mechanism of the vehicle, and means for operatively connecting the rock shaft with the change speed mechanism of the vehicle.

22. In a unit control device for motor vehicles, the combination of a pivoted lever mounted upon the frame of the vehicle, a guide located adjacent to said lever and attached to the frame of the vehicle, a shaft rockingly mounted in engagement with and supported by said lever and adapted to be partially rotated with respect to the lever when said lever is in a predetermined position, a locking member fixed to said shaft and movable longitudinally of said guide and provided with guide-engaging surface portions disposed at an angle with relation to each other and adapted to be moved successively into and out of engagement with said guide, and means for limiting the rotary movement of the shaft when the said locking member is out of engagement with the guide.

In testimony, that I claim the foregoing as my invention I affix my signature in the presence of two witnesses, this 16th day of August A. D. 1912.

FRANK E. SPERRY.

Witnesses:
J. C. Dufresne,
G. P. Shambo.

---

Copies of this patent may be obtained for five cents each, by addressing the "Commissioner of Patents, Washington, D. C."